United States Patent
Sikka et al.

(10) Patent No.: US 12,547,924 B2
(45) Date of Patent: Feb. 10, 2026

(54) VISUALLY CREATING AND MONITORING MACHINE LEARNING MODELS

(71) Applicant: VIANAI SYSTEMS, INC., Palo Alto, CA (US)

(72) Inventors: Vishal Inder Sikka, Los Altos Hills, CA (US); Daniel James Amelang, San Diego, CA (US); Kevin Frederick Dunnell, Waltham, MA (US)

(73) Assignee: VIANAI SYSTEMS, INC., Palo Alto, CA (US)

( * ) Notice: Subject to any disclaimer, the term of this patent is extended or adjusted under 35 U.S.C. 154(b) by 608 days.

(21) Appl. No.: 17/017,594

(22) Filed: Sep. 10, 2020

(65) Prior Publication Data

US 2021/0081841 A1 Mar. 18, 2021

Related U.S. Application Data

(60) Provisional application No. 62/899,264, filed on Sep. 12, 2019.

(51) Int. Cl.
  *G06N 20/00* (2019.01)
  *G06N 5/04* (2023.01)

(52) U.S. Cl.
  CPC .............. *G06N 20/00* (2019.01); *G06N 5/04* (2013.01)

(58) Field of Classification Search
  CPC .......... G06N 20/00; G06N 5/04; G06N 3/084; G06N 3/105; G06N 3/0481; G06N 3/0454; G06F 8/34
  See application file for complete search history.

(56) References Cited

U.S. PATENT DOCUMENTS

| | | | |
|---|---|---|---|
| 10,719,301 B1 * | 7/2020 | Dasgupta | G06K 9/6267 |
| 2015/0169532 A1 * | 6/2015 | Otero | G06F 40/18 |
| | | | 715/212 |
| 2018/0089592 A1 * | 3/2018 | Zeiler | G06N 3/045 |
| 2018/0197068 A1 * | 7/2018 | Narayanaswami | G06N 3/045 |

(Continued)

FOREIGN PATENT DOCUMENTS

| | | | | |
|---|---|---|---|---|
| CA | 3044254 A1 * | 5/2018 | | C12Q 1/68 |
| CN | 111190581 A | 5/2020 | | |

(Continued)

OTHER PUBLICATIONS

Hu, "DeepGraph: A PyCharm Tool for Visualizing and Understanding Deep Learning Models", 2018 25th Asia-Pacific Software Engineering Conference. (Year: 2018).*

(Continued)

*Primary Examiner* — Dave Misir
(74) *Attorney, Agent, or Firm* — Artegis Law Group, LLP

(57) ABSTRACT

One embodiment of the present invention sets forth a technique for creating a machine learning model. The technique includes generating a user interface comprising one or more components for visually generating the machine learning model. The technique also includes modifying source code specifying a plurality of mathematical expressions that define the machine learning model based on user input received through the user interface. The technique further includes compiling the source code into compiled code that, when executed, causes one or more parameters of the machine learning model to be learned during training of the machine learning model.

20 Claims, 12 Drawing Sheets

(56) References Cited

U.S. PATENT DOCUMENTS

| | | | | |
|---|---|---|---|---|
| 2018/0307978 | A1* | 10/2018 | Ar | G06N 3/105 |
| 2021/0012206 | A1* | 1/2021 | Sikka | G06N 3/105 |
| 2021/0012209 | A1* | 1/2021 | Sikka | G06N 3/084 |
| 2021/0055915 | A1* | 2/2021 | Guo | G06F 3/04817 |

FOREIGN PATENT DOCUMENTS

| | | |
|---|---|---|
| CN | 111310936 A | 6/2020 |
| JP | 2015-167041 A | 9/2015 |
| JP | 2018-014060 A | 1/2018 |
| WO | 2016/166881 A1 | 10/2016 |
| WO | 2017/138220 A1 | 8/2017 |

OTHER PUBLICATIONS

Hu, "DeepGraph: A PyCharm Tool for Visualizing and Understanding Deep Learning Models", 2018 25th Asia-Pacific Software Engineering Conference. (Previously supplied). (Year: 2018).*
International Search Report for application No. PCT/US2020/050569 dated Jan. 11, 2021.
Tamilselvam et al., "A Visual Programming Paradigm for Abstract Deep Learning Model Development", arXiv:1905.02486v2, XP081463913, Aug. 19, 2019, 12 pages.
Xie et al., "Deep Visual: A Visual Programming Tool for Deep Learning Systems", ICPC'19 (Proc), DOI 10.1109/ICPC.2019.00028, XP033606558, May 25, 2019, pp. 130-134.
Mahouachi et al., "Deep Learning Visual Programming", Proceedings of SPIE, DOI: 10.1117/12.2519882, XP060120812, vol. 11013, May 10, 2019, pp. 1101308:1-1101308:10.
Docheva et al., "Implementation of Analog Neural Networks with Labview", Proceedings of the 47th International Scientific Conference on Information. Communication and Energy Systems and Technologies (ICEST 1 12), XP055758122, ISBN: 978-619-167-003-1, vol. 2, Jun. 28-30, 2012, pp. 367-370.
Akaishi, Masanori, "Machine Learning and Deep Learning Starting with Watson Studio", 1st Edition, Japan, Ric Telecom Co., Ltd, Dec. 4, 2018, pp. 77-83,167-182.
Tosi et al., "Simbrain 3.0: A Flexible, Visually-Oriented Neural Network Simulator", Neural Networks, http://dx.doi.org/10.1016/j.neunet.2016.07.005, vol. 83, Dec. 31, 2016, pp. 1-10.

* cited by examiner

VISUALLY CREATING AND MONITORING MACHINE LEARNING MODELS

CROSS-REFERENCE TO RELATED APPLICATIONS

This application claims the priority benefit of U.S. Provisional patent application titled: "TECHNIQUES FOR DEFINING AND EVALUATING NEURAL NETWORK ARCHITECTURES AND CORRESPONDING TRAINING DATA," and filed on Sep. 12, 2019 having Ser. No. 62/899,264. The subject matter of this related application is hereby incorporated by reference.

BACKGROUND

Field of the Various Embodiments

Embodiments of the present disclosure relate generally to machine learning, and more specifically, to techniques for visually creating and monitoring machine learning models.

Description of the Related Art

Machine learning may be used to discover trends, patterns, relationships, and/or other attributes related to large sets of complex, interconnected, and/or multidimensional data. To glean insights from large data sets, regression models, artificial neural networks, support vector machines, decision trees, naïve Bayes classifiers, and/or other types of machine learning models may be trained using input-output pairs in the data. In turn, the discovered information may be used to guide decisions and/or perform actions related to the data. For example, the output of a machine learning model may be used to guide marketing decisions, assess risk, detect fraud, predict behavior, control an autonomous vehicle, and/or customize or optimize use of an application or website.

Within machine learning, neural networks can be trained to perform a wide range of tasks with a high degree of accuracy. Neural networks are therefore becoming widely adopted in the field of artificial intelligence. Neural networks can have a diverse range of network architectures. In more complex scenarios, the network architecture for a neural network can include many different types of layers with an intricate topology of connections among the different layers. For example, some neural networks can have ten or more layers, where each layer can include hundreds or thousands of neurons and can be coupled to one or more other layers via hundreds or thousands of individual connections.

During the neural network development process, a designer writes program code to create a neural network architecture that addresses a particular type of problem. The designer then trains the neural network using training data and target outputs that the neural network should produce when processing that training data. For example, the designer could train the neural network based on a set of images that display various landscapes along with labels indicating the types of landscapes shown in the set of images.

When writing program code for a neural network, designers oftentimes rely on one or more programming libraries that expose various tools for facilitating neural network design and the overall coding process. One drawback of using these types of programming libraries is that complex software stacks that are difficult to understand and master usually have to be installed and executed to use the programming libraries. For example, to define a neural network, a developer may have to install several libraries, where each library has thousands of lines of code, even when much of the functionality exposed by those libraries goes unused when defining, training, and/or executing the neural network. Consequently, the pool of proficient neural network developers is limited to a small set of developers who have attained the requisite level of expertise in using the relevant complex software stacks. These complex software stacks also require significant computational and memory resources for proper execution. As a result, the pool of neural network developers is further limited to those who have access to more sophisticated hardware that meets those computational and memory requirements.

Another drawback of using conventional programming libraries when designing neural networks is that these programming libraries generally allow a designer to control only a limited number of neural network features. In particular, the programming libraries typically include layer definition functions that are rigid and impose limits on the types and parameters of neural network layers that can be defined. For example, some conventional programming libraries require a designer to specify explicitly which variables in a given layer of a neural network are learned during the training phase or have hard coded rules that permit only weight parameters of layers to be learned during the training phase. These types of constraints prevent developers from being creative and being able to explore a wide range of configurations when designing neural networks.

As an alternative to using conventional programming libraries, a designer may write code for a neural network using a traditional programming language, such as Python, C, C++, or Java. However, traditional programming language frameworks are not well suited for defining and implementing mathematics-based operations easily, like those at the core of neural network architectures. As a result, a designer typically has to write large amounts of complex code that defines how each layer in the neural network operates, specifies how the various layers are coupled together, and delineates the various operations performed by the different layers. Further, variables that are learned during the training phase are unassigned when the code for a neural network is compiled. Conventional compilers for traditional programming languages issue errors when unassigned variables are encountered during compile time. To address these types of errors, a developer has to assign random values to the unassigned variables, which can introduce a built-in bias into the training phase and negatively impact the training process and/or the accuracy of the trained neural network.

As the foregoing illustrates, what is needed in the art are more effective techniques for defining neural networks and/or other types of machine learning models.

SUMMARY

One embodiment of the present invention sets forth a technique for creating a machine learning model. The technique includes generating a user interface comprising one or more components for visually generating the machine learning model. The technique also includes modifying source code specifying a plurality of mathematical expressions that define the machine learning model based on user input received through the user interface. The technique further includes compiling the source code into compiled code that, when executed, causes one or more parameters of the machine learning model to be learned during training of the machine learning model.

At least one technological advantage of the disclosed techniques includes reduced overhead over conventional techniques that involve additional processing time and/or resource consumption to carry out multiple rounds of writing, debugging, and compiling code for the machine learning models; manually defining and executing workflows and pipelines for training, testing, and validating the machine learning models; and tracking different versions of the machine learning models, datasets, and/or experiments. Visual representations of the machine learning models, datasets, and associated performance metrics may additionally improve understanding of the machine learning models, identification of features or other attributes that affect the performance of the machine learning models, and/or alignment of performance metrics with higher-level goals and objectives. In turn, machine learning models created using the AI application and user interface may have better performance and/or faster convergence than machine learning models that are created using conventional tools. Consequently, the disclosed techniques provide technological improvements in applications, tools, and/or computer systems for designing, training, evaluating, and/or selecting machine learning models.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
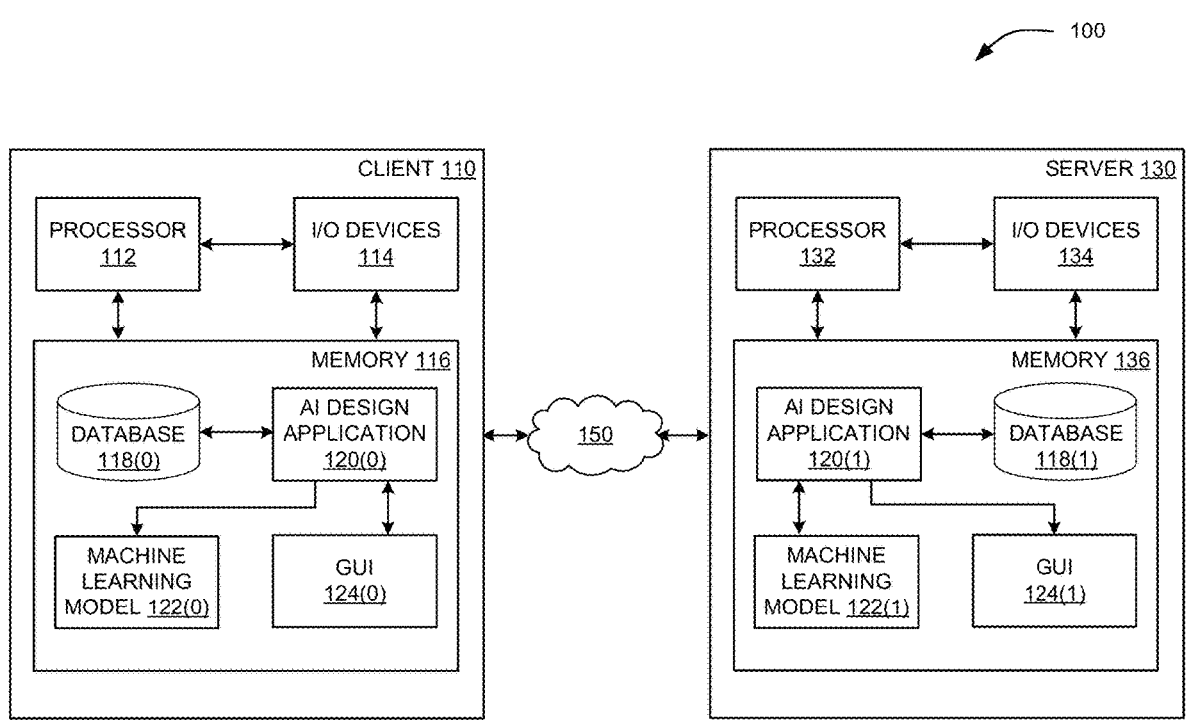
FIG. 1 illustrates a system configured to implement one or more aspects of the various embodiments.

FIG. 1 illustrates a system configured to implement one or more aspects of the various embodiments. As shown, system 100 includes client 110 and server 130 coupled together via network 150. Client 110 or server 130 may be any technically feasible type of computer system, including a desktop computer, a laptop computer, a mobile device, a virtualized instance of a computing device, a distributed and/or cloud-based computer system, and so forth. Network 150 may be any technically feasible set of interconnected communication links, including a local area network (LAN), wide area network (WAN), the World Wide Web, or the Internet, among others. Client 110 and server 130 are configured to communicate via network 150.

As further shown, client 110 includes processor 112, input/output (I/O) devices 114, and memory 116, coupled together. Processor 112 includes any technically feasible set of hardware units configured to process data and execute software applications. For example, processor 112 could include one or more central processing units (CPUs), one or more graphics processing units (GPUs), and/or one or more parallel processing units (PPUs). I/O devices 114 include any technically feasible set of devices configured to perform input and/or output operations, including, for example, a display device, a keyboard, and a touchscreen, among others.

Memory 116 includes any technically feasible storage media configured to store data and software applications, such as, for example, a hard disk, a random-access memory (RAM) module, and a read-only memory (ROM). Memory 116 includes a database 118(0), an artificial intelligence (AI) design application 120(0), a machine learning model 122(0), and a graphical user interface (GUI) 124(0). Database 118(0) is a file system and/or data storage application that stores various types of data. AI design application 120(0) is a software application that, when executed by processor 112, interoperates with a corresponding software application executing on server 130 to generate, analyze, evaluate, and describe one or more machine learning models. Machine learning model 122(0) includes one or more artificial neural networks, support vector machines, regression models, tree-based models, hierarchical models, ensemble models, and/or other types of models configured to perform general-purpose or specialized artificial intelligence-oriented operations. GUI 124(0) allows a user to interface with AI design application 120(0).

Server 130 includes processor 132, I/O devices 134, and memory 136, coupled together. Processor 132 includes any technically feasible set of hardware units configured to process data and execute software applications, such as one or more CPUs, one or more GPUs, and/or one or more PPUs. I/O devices 134 include any technically feasible set of devices configured to perform input and/or output operations, such as a display device, a keyboard, or a touchscreen, among others.

Memory 136 includes any technically feasible storage media configured to store data and software applications, such as, for example, a hard disk, a RAM module, and a ROM. Memory 136 includes database 118(1), AI design application 120(1), Machine learning model 122(1), and GUI 124(1). Database 118(1) is a file system and/or data storage application that stores various types of data, similar to database 118(1). AI design application 120(1) is a software application that, when executed by processor 132, interoperates with AI design application 120(0) to generate, analyze, evaluate, and describe one or more machine learning models. Machine learning model 122(1) includes one or more artificial neural networks, support vector machines, regression models, tree-based models, hierarchical models, ensemble models, and/or other types of models configured to perform general-purpose or specialized artificial intelligence-oriented operations. GUI 124(1) allows a user to interface with AI design application 120(1).

As a general matter, database 118(0) and 118(1) represent separate portions of a distributed storage entity. Thus, for simplicity, databases 118(0) and 118(1) are collectively referred to herein as database 118. Similarly, AI design applications 120(0) and 120(1) represent separate portions of a distributed software entity that is configured to perform any and all of the inventive operations described herein. As such, AI design applications 120(0) and 120(1) are collectively referred to hereinafter as AI design application 120. Machine learning models 122(0) and 122(1) likewise represent a distributed machine learning model and are collectively referred to herein as machine learning model 122. GUIs 124(0) and 124(1) similarly represent distributed portions of one or more GUIs and are collectively referred to herein as GUI 124.

In operation, AI design application 120 generates machine learning model 122 based on user input that is received via GUI 124. GUI 124 exposes design and analysis tools that allow the user to create and edit machine learning model 122, explore the functionality of machine learning model 122, evaluate machine learning model 122 relative to training data, and generate various data describing and/or constraining the performance and/or operation of machine learning model 122, among other operations. Various modules within AI design application 120 that perform the above operations are described in greater detail below in conjunction with FIG. 2.

Figure 2:
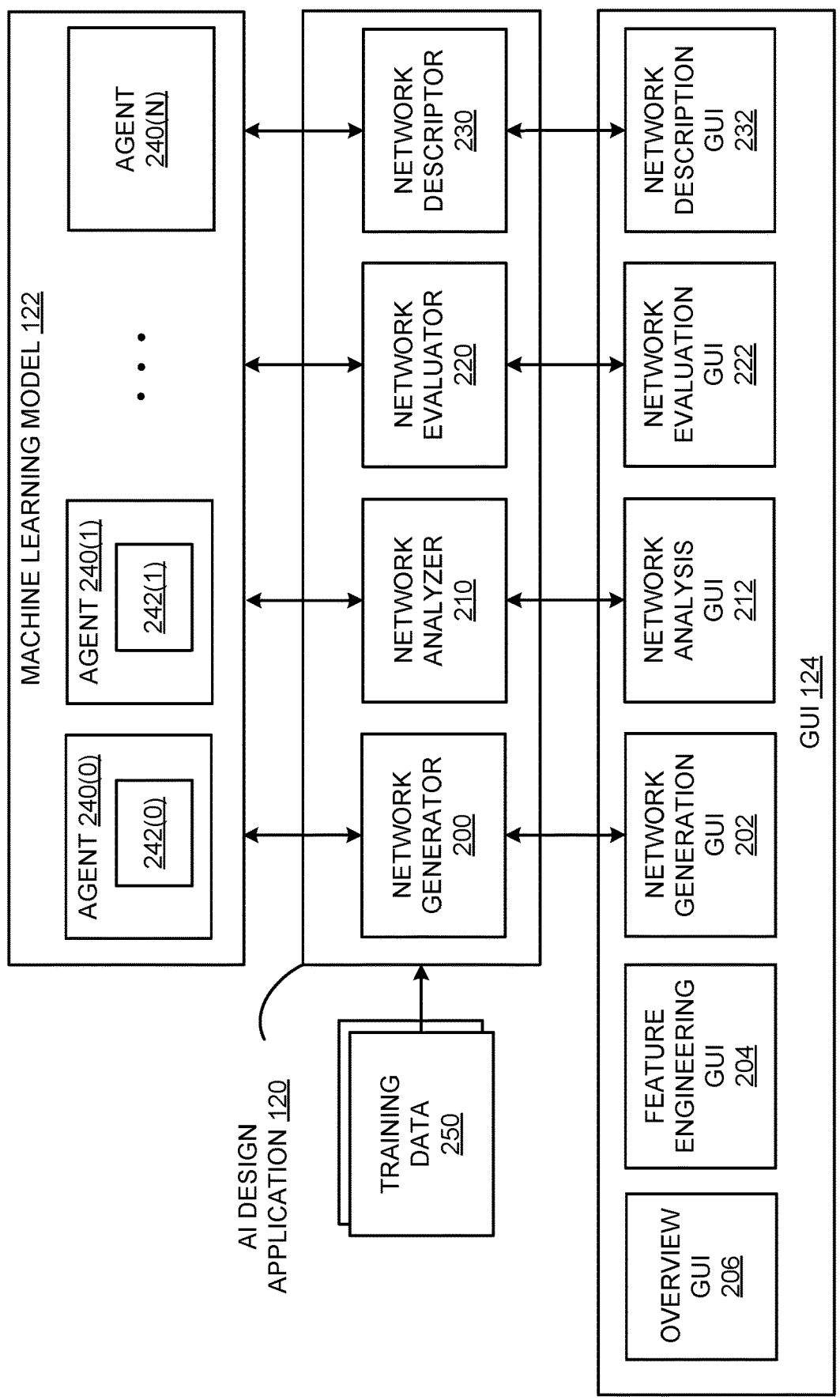
FIG. 2 is a more detailed illustration of the AI design application of FIG. 1, according to various embodiments.

FIG. 2 is a more detailed illustration of AI design application 120 of FIG. 1, according to various embodiments. As shown, AI design application 120 includes network generator 200, network analyzer 210, network evaluator 220, and a network descriptor 230; machine learning model 122 includes one or more agents 240; and GUI 124 includes an overview GUI 206, a feature engineering GUI 204, a network generation GUI 202, a network analysis GUI 212, a network evaluation GUI 222, and a network description GUI 232.

In operation, network generator 200 renders network generation GUI 202 to provide the user with tools for designing and connecting agents 240 within machine learning model 122. A given agent 240 may include a neural network 242 (or another type of machine learning model) that performs various AI-oriented tasks. A given agent 240 may also include other types of functional elements that perform generic tasks. Network generator 200 trains neural networks 242 included in specific agents 240 based on training data 250. Training data 250 can include any technically feasible type of data for training neural networks. For example, training data 250 could include the Modified National Institute of Standards and Technology (MNIST) digits training set.

When training is complete, network analyzer 210 renders network analysis GUI 212 to provide the user with tools for analyzing and understanding how a neural network (or another type of machine learning model 122) within a given agent 240 operates. In particular, network analyzer 210 causes network analysis GUI 212 to display various connections and weights within a given neural network 242 and to simulate the response of the given neural network 242 to various inputs, among other operations.

In addition, network evaluator 220 renders network evaluation GUI 222 to provide the user with tools for evaluating a given neural network 242 relative to training data 250. More specifically, network evaluator 220 receives user input via network evaluation GUI 222 indicating a particular portion of training data 250. Network evaluator 220 then simulates how the given neural network 242 responds to that portion of training data 250. Network evaluator 220 can also cause network evaluation GUI 222 to filter specific portions of training data 250 that cause the given neural network 242 to generate certain types of outputs.

In conjunction with the above, network descriptor 230 analyzes a given neural network 242 associated with agent 240 and generates a natural language expression that describes the performance of the neural network 242 to the user. Network descriptor 230 can also provide various "common sense" facts to the user related to how the neural network 242 interprets training data 250. Network descriptor 230 outputs this data to the user via network description GUI 232. In addition, network descriptor 230 can obtain rule-based expressions from the user via network description GUI 232 and then constrain network behavior based on these expressions. Further, network descriptor 230 can generate metrics that quantify various aspects of network performance and then display these metrics to the user via network description GUI 232.

As shown, GUI 124 additionally includes overview GUI 206 and feature engineering GUI 204, which may be rendered by AI design application 120 and/or another component of the system. Overview GUI 206 includes one or more user-interface elements for viewing, setting, and/or otherwise managing objectives associated with projects or experiments involving neural network 242 and/or other machine learning models 122. Feature engineering GUI 204 includes one or more user-interface elements for viewing, organizing, creating, and/or otherwise managing features inputted into neural network 242 and/or other machine learning models 122. GUI 124 is described in further detail below with respect to FIGS. 5A-5G.

Referring generally to FIGS. 1-2, AI design application 120 advantageously provides the user with various tools for generating, analyzing, evaluating, and describing neural network behavior. The disclosed techniques differ from conventional approaches to generating neural networks, which generally obfuscate network training and subsequent operation from the user.

Figure 3:
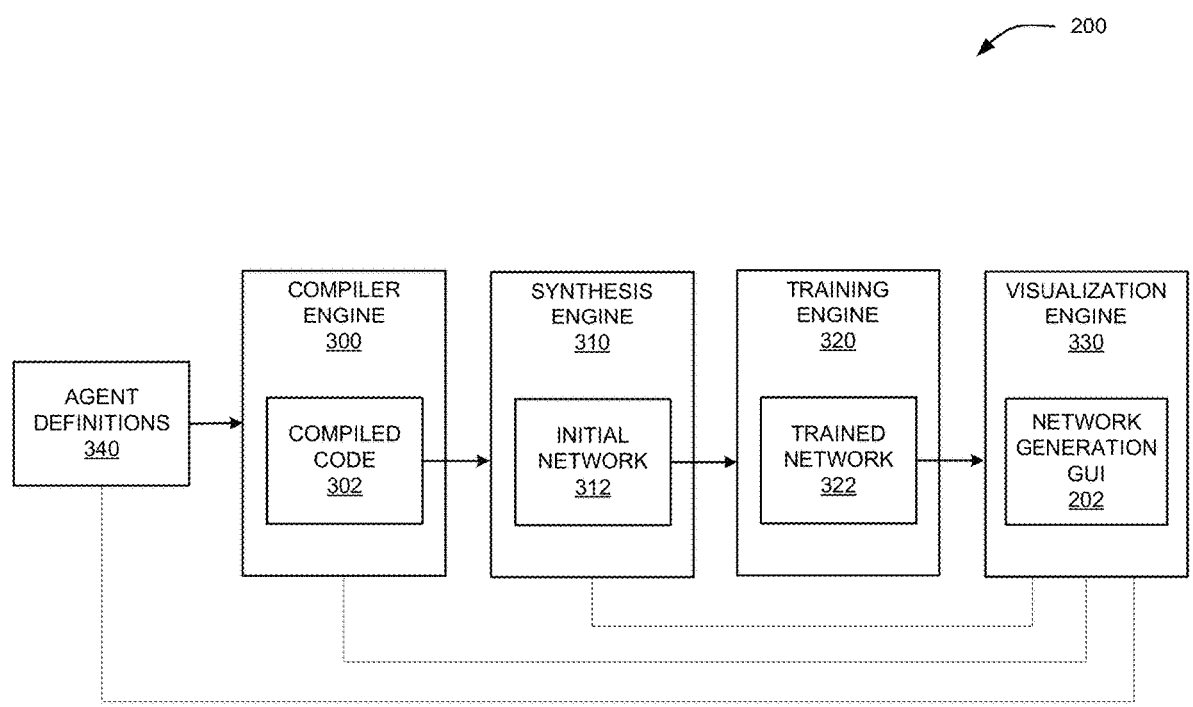
FIG. 3 is a more detailed illustration of the network generator of FIG. 2, according to various embodiments.

FIG. 3 is a more detailed illustration of the network generator of FIG. 1, according to various embodiments. As shown, network generator 200 includes compiler engine 300, synthesis engine 310, training engine 320, and visualization engine 330.

In operation, visualization engine 330 generates network generation GUI 202 and obtains agent definitions 340 from the user via network generation GUI 202. Compiler engine 300 compiles program code included in a given agent definition 340 to generate compiled code 302. Compiler engine 300 is configured to parse, compile, and/or interpret any technically feasible programming language, including C, C++, Python and associated frameworks, JavaScript and associated frameworks, and so forth. Synthesis engine 310 generates initial network 312 based on compiled code 302 and on or more parameters that influence how that code executes. Initial network 312 is untrained and may lack the ability to perform one or more intended operations with a high degree of accuracy.

Training engine 320 trains initial network 312 based on training data 250 to generate trained network 322. Trained network 322 may perform the one or more intended operations with a higher degree of accuracy than initial network 312. Training engine 320 may perform any technically feasible type of training operation, including backpropagation, gradient descent, and so forth. Visualization engine 330 updates network generation GUI 202 in conjunction with the above operations to graphically depict the network architecture defined via agent definitions 340 as well as to illustrate various performance attributes of trained network 322.

Mathematics-Based Programming and Execution of Neural Network Agents

As discussed above, in order to define and execute a neural network architecture, a developer typically uses cumbersome tools and libraries that are difficult to master and often obfuscate much of the details of the underlying network architecture. As a consequence, neural networks can be created only by a few set of developers who have expertise in the various tools and libraries. Further, because the underlying details of a network architecture are nested deep within the frameworks of the tools and libraries, a developer may not understand how the architecture functions or how to change or improve upon the architecture. To address these and other deficiencies in the neural network definition paradigm, a mathematics-based programming and execution framework for defining neural network architectures is discussed below.

In various embodiments, the source code for a neural network agent definition in a mathematics-based programming language is a pipeline of linked mathematical expressions. The source code is compiled into machine code without needing any intermediary libraries, where the machine code is representative of a trainable and executable neural network. For the neural network architecture to be defined in source code as a series of mathematical expressions, the mathematics-based programming language exposes several building blocks. These include a layer notation for specifying a layer of a neural network, a link notation for specifying a link between two or more layers of a neural network or two or more neural networks, a variable assignment notation for specifying a source of a variable (=), and various mathematical operation notations such as sum (+), division (/), summation ($\Sigma$), open and close parenthesis (( )), matrix definition, set membership ($\in$), etc.

Each layer of a neural network is defined in the mathematics-based programming language as one or more mathematical expressions using the building blocks discussed above. For example, a convolution layer may be defined using the following source code that includes a set of mathematical expressions:

$$\text{CONVOLUTION: } (X \in R^{m \times m \times v}) \rightarrow (Y \in R^{n \times n \times v})$$

where $$y_{i,j,k} = \left( \sum_{i=1}^{r} \sum_{j=1}^{r} \sum_{k=1}^{p} w_{i,u,v,k} a + b_k \right)^+$$

-continued $$W \in R^{n \times n \times p \times q},$$
$$b \in R^p$$
$$y, x, z \in Z$$
$$c = a(i-1) - x + i$$
$$d = e(j-1) - x + v$$
$$a = \begin{cases} x_{c,d,x} & \text{if } 1 \leq c \leq m \text{ and } 1 \leq d \leq m \\ 0 & \text{otherwise} \end{cases}$$

In the above example, the first line of the source code indicates that the subsequent lines of the source code are related to a CONVOLUTION operation that has an input X and an output Y. The subsequent lines of the source code include a sequence of mathematical expressions that define the mathematical operations performed on the input X to generate the output Y. Each mathematical expression includes a right hand-side portion and a left-hand side portion. The left-hand side portion specifies a value that is determined when a mathematics operation specified by the right-hand portion is evaluated. For example, in the mathematical expression "c=s(i−1)−z+t" shown above, "c" is the left-hand side portion and specifies that the variable c is assigned to the value generated when the right-hand side portion of "s(i−1)−z+t" is evaluated.

The values of variables included in the source code of a neural network agent are either assigned when the neural network is instantiated or are learned during training of the neural network. Unlike other neural network definition paradigms, a developer of a neural network agent defined using the mathematics-based programming language has control over which variables are to be learned during training (referred to herein as "learned variables"). Further, the variables that are to be learned during training can remain uninitialized (La, without being assigned a value or a source of a value) even when the neural network is instantiated. The techniques for handling these learned variables during the compilation and training of a neural network are discussed below in detail in conjunction with FIGS. 4-6.

Figure 4:
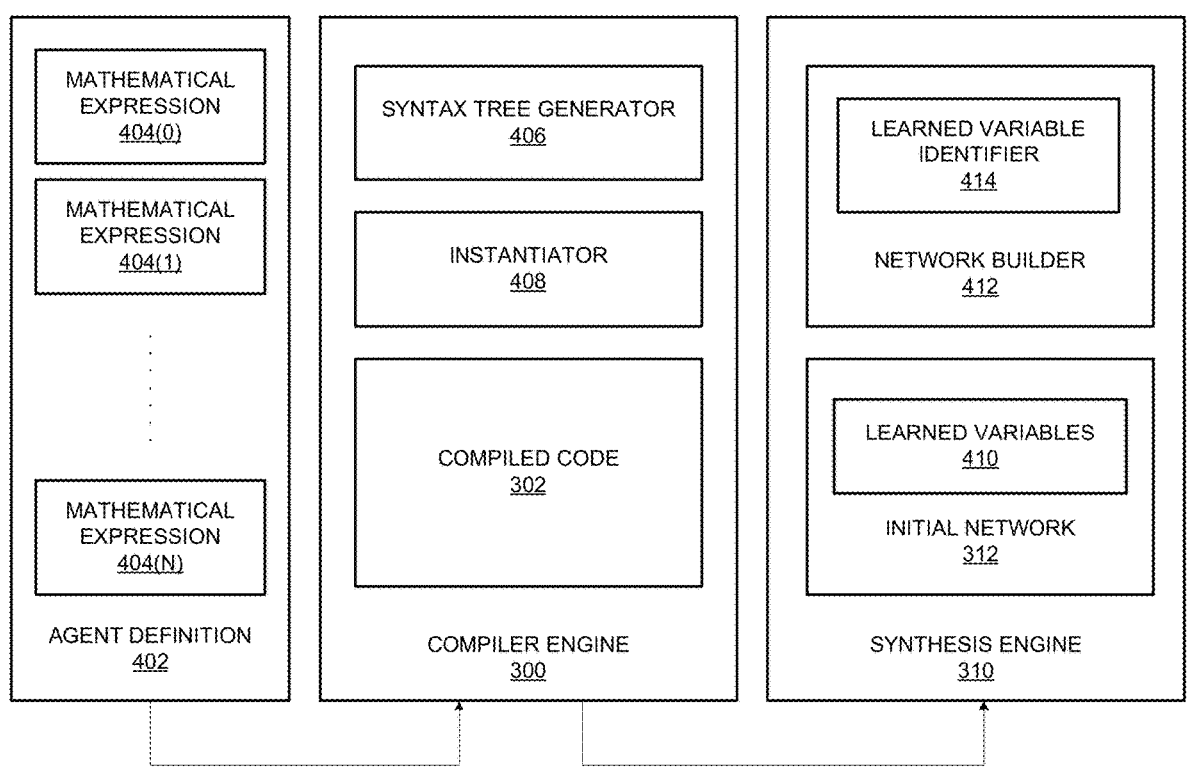
FIG. 4 is a more detailed illustration of the compiler engine and the synthesis engine of FIG. 3, according to various embodiments.

FIG. 4 is a more detailed illustration of compiler engine 300 and synthesis engine 310 of FIG. 3, according to various embodiments. As shown, compiler engine 300 includes syntax tree generator 406, instantiator 408, and compiled code 302. Synthesis engine 310 includes network builder 412 and initial network 312, which includes learned variables 410.

The operation of compiler engine 300 and synthesis engine 310 are described in conjunction with a given agent definition 402. The source code of agent definition 402 includes multiple layer specifications, where each layer specification includes one or more mathematical expressions 404 (individually referred to as mathematical expression 404) defined using the mathematics-based programming language. As discussed above, each mathematical expression 404 includes a left-hand side portion that specifies a value that is determined when a mathematics operation specified by the right-hand portion is evaluated. Mathematical expressions 404 may be grouped, such that each group corresponds to a different layer of a neural network architecture. The source code of agent definition 402 specifies the links between different groups of mathematical expressions 404.

Compiler engine 300 compiles the source code of agent definition 402 into compiled code 302. To generate compiled code 302, the compiler engine 300 includes syntax tree generator 406 and instantiator 408. Syntax tree generator 406 parses the source code of the agent definition 402 and generates an abstract syntax tree (AST) representation of the source code. In various embodiments, the AST representation includes a tree structure of nodes, where constants and variables are child nodes to parent nodes including operators or statements. The AST encapsulates the syntactical structure of the source code, i.e., the statements, the mathematical expressions, the variable, and the relationship between those contained within the source code.

Instantiator 408 processes the AST to generate compiled code 302. In operation, instantiator 408 performs semantic analysis on the AST, generates intermediate representations of the code, performs optimizations, and generates machine code that includes compiled code 302. For the semantic analysis, instantiator 408 checks the source code for semantic correctness. In various embodiments, a semantic check determines whether variables and types included in the AST are properly declared and that the types of operators and objects match. In order to perform the semantic analysis, instantiator 408 instantiates all of the instances of a given object or function type that are included in the source code. Further, instantiator 408 generates a symbol table representing all the named objects—classes, variables, and functions—and uses the symbol table to perform the semantic check on the source code.

Instantiator 408 performs a mapping operation for each variable in the symbol table to determine whether the value of the variable is assigned to a source identified in the source code. Instantiator 408 flags the variables that do not have an assigned source as potential learned variables, i.e., the variables that are to be learned during the training process. In various embodiments, these variables do not have a special type indicating that the variables are learned variables. Further, the source code does not expressly indicate that the variables are learned variables. Instantiator 408 automatically identifies those variables as potential variables that are to be learned by virtue of those variables not being assigned to a source. Thus, instantiator 408 operates differently from traditional compilers and interpreters, which would not allow for a variable to be unassigned, undeclared, or otherwise undefined and raise an error during the compilation process.

Instantiator 408 transmits compiled code 302 and a list of potential learned variables to synthesis engine 310. As discussed above, synthesis engine 310 generates initial network 312 based on compiled code 302 and on or more parameters that influence how compiled code 302 executes. In particular, network builder 412 analyzes the structure of compiled code 302 to determine the different layers of the neural network architecture and how the outputs of a given layer are linked into inputs of one or more subsequent layers. In various embodiments, network builder 412 also receives, via user input for example, values for certain variables included in compiled code 302.

Learned variable identifier 414 included in network builder 412 identifies learned variables 410 within initial network 312. In operation, learned variable identifier 414 analyzes the list of potential learned variables received from instantiator 408 in view of the structure of the layers of the neural network architecture determined by network builder 412 and any values for variables received by network builder 412. For each of the potential learned variables, learned variable identifier 414 determines whether the source of the potential learned variable in a given layer of the neural network architecture is an output from a prior layer of the neural network architecture. If such a source exists, then the potential learned variable is not a variable that is to be learned during training of the neural network. Similarly, learned variable identifier 414 determines whether a value for a potential learned variable has been expressly provided to network builder 412. If such a value has been provided, then the potential learned variable is not a variable that is to be learned during training of the neural network. In such a manner, learned variable identifier 414 processes each of the potential learned variables to determine whether the potential learned variable is truly a variable that is to be learned during training. Once all of the potential learned variables have been processed, learned variable identifier 414 identifies any of the potential learned variables for which a source was not determined. These variables make up learned variables 410 of initial network 312.

In various embodiments, learned variable identifier 414 causes network generation GUI 202 to display learned variables 410 identified by learned variable identifier 414. Learned variables 410 can then be confirmed by or otherwise modified by a user of the GUI 202, such as the developer of the neural network architecture.

As discussed above, training engine 320 trains initial network 312 based on training data 250 to generate trained network 322. Trained network 322 includes values for learned variables 410 that are learned during the training process. Trained network 322 may perform the one or more intended operations with a higher degree of accuracy than initial network 312. Training engine 320 may perform any technically feasible type of training operation, including backpropagation, gradient descent, hyperparameter tuning, and so forth.

Visually Creating and Monitoring Machine Learning Models

As mentioned above, GUI 124 includes components that allow users to interface with AI design application 120. These components include, but are not limited to, overview GUI 206, feature engineering GUI 204, network generation GUI 202, network analysis GUI 212, network evaluation GUI 222, network description GUI 232. As described in further detail below, these components may streamline processes and technologies for creating, training, evaluating, and/or otherwise monitoring the operation of machine learning models (e.g., machine learning model 122) and/or projects involving machine learning models.

Figure 5A:
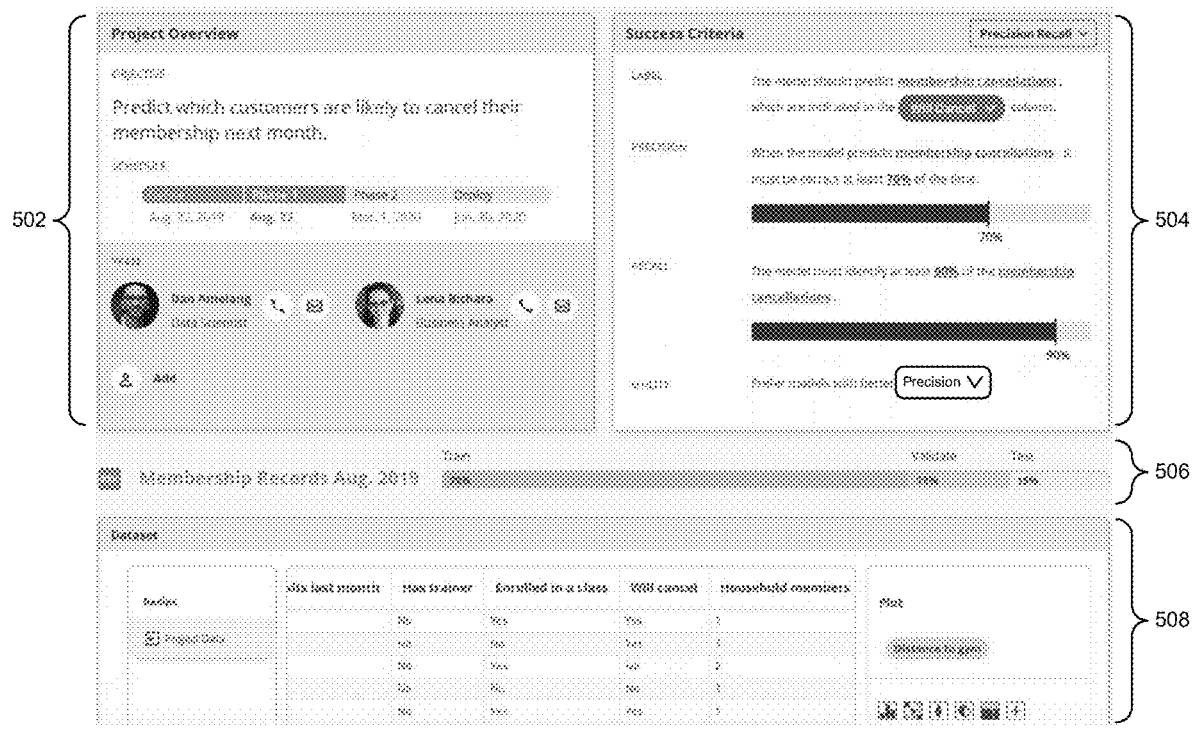
FIG. 5A is an example screenshot of the graphical user interface (GUI) of FIG. 1, according to various embodiments.

FIG. 5A is an example screenshot of GUI 124 of FIG. 1, according to various embodiments. More specifically, FIG. 5A includes a screenshot of an example overview GUI 206, which includes a number of components 502-508 for reviewing, setting, and/or managing objectives related to a project involving one or more machine learning models 122.

Component 502 includes a "Project Overview" section that provides high-level information related to the project. This information includes a stated objective to "Predict which customers are likely to cancel their membership next month," a schedule with multiple phases, and members of a team involved in the project.

Component 504 is used to view and/or modify "Success Criteria" related to the project. In particular, component 504 identifies a label of "membership cancellations" to be predicted by the machine learning model(s); values of the label are obtained from the "Will Cancel" column in a dataset used to train and evaluate the machine learning model(s). Component 504 also specifies a minimum threshold of 70% for the precision of the machine learning model(s) and a minimum threshold of 90% for the recall of the machine learning model(s). Component 504 additionally indicates that precision is to be prioritized over recall in training and/or optimizing the machine learning model(s).

Within component 504, a user may interact with highlighted portions of text and/or drop-down menus to view additional information related to and/or modify the success criteria. For example, the user may click the term of "membership cancellations" to view a definition of the term. In another example, the user may select a different label to be predicted from the drop-down menu that currently shows "Will Cancel." In a third example, the user may adjust the precision and recall thresholds by interacting with the corresponding sliders. In a fourth example, the user may select a different performance metric to be prioritized from a drop-down menu that currently shows "Precision."

Component 506 shows a division of a "Membership Records Aug. 2019" dataset into 70% training, 15% validation, and 15% testing for the machine learning model(s). The user may change the proportions of the dataset used in training, validation, and/or testing by interacting with the bar that represents the proportions.

Component 508 shows information related to the dataset. In particular, component 508 includes one or more recipes related to the dataset, as well as a table of rows and columns in the dataset. This table includes the "Will cancel" label selected in component 504, as well as additional columns that can be used to predict the label. Component 508 additionally includes a "Plot" section that can be used to view various plots of the data in the dataset. For example, a user may interact with the "Plot" section to view bar charts, violin plots, pie charts, mosaic plots, histograms, correlation matrixes, and/or other visualizations of correlations or other relationships between or among the columns of the dataset. Within component 508, the user may click on the "+" button to add a user-defined visual to the "Plot" section. This user-defined visual can be built using various programming languages and/or data-visualization libraries.

Figure 5B:
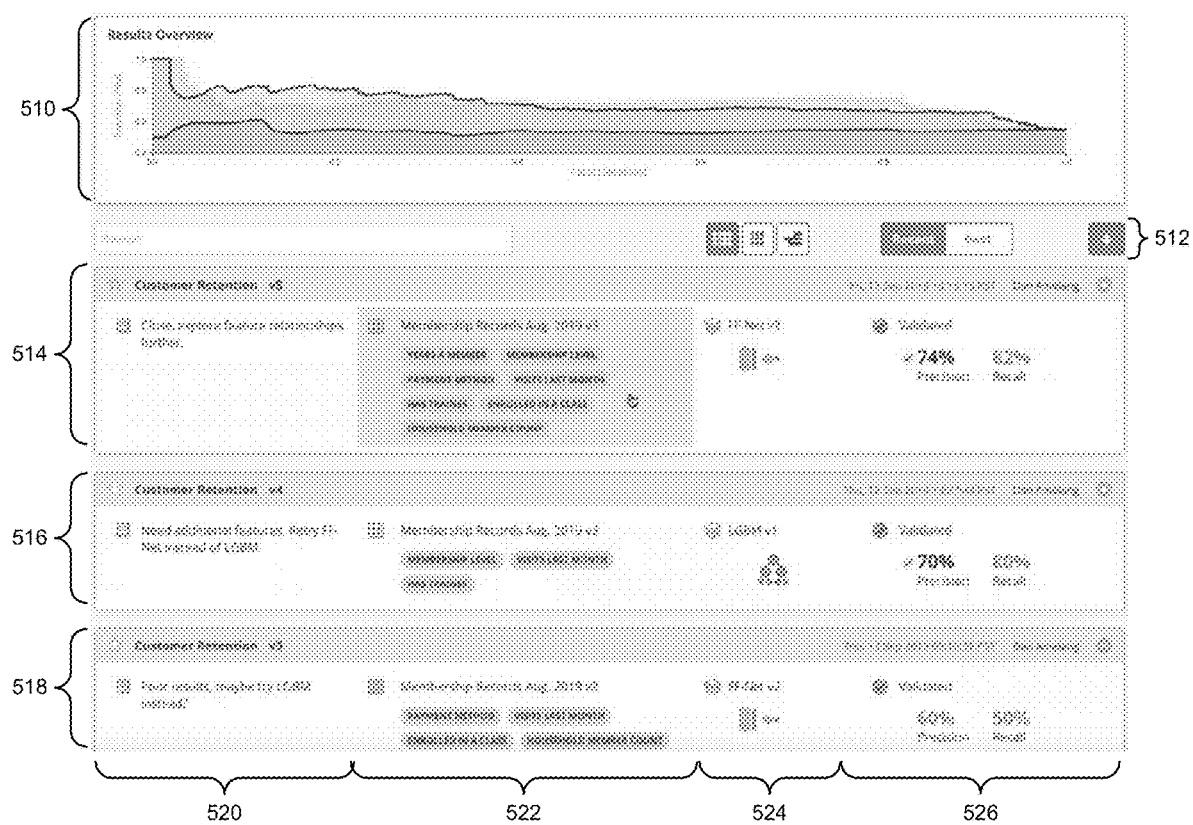
FIG. 5B is an example screenshot of the GUI of FIG. 1, according to various embodiments.

FIG. 5B is an example screenshot of GUI 124 of FIG. 1, according to various embodiments. More specifically, FIG. 5B shows a different screen of the example overview GUI 206 of FIG. 5A. This screen includes a number of components 510-518 for reviewing and/or managing a number of experiments associated with the machine learning model(s) or project related to the screen of FIG. 5A.

Component 510 shows aggregated results of the experiments in a number of precision-recall curves, and each of components 514-518 shows high-level information related to a corresponding experiment. In particular, information in components 514-518 is organized into a number of columns 520-526. Column 520 includes notes by data scientists and/or other users involved in the experiments, column 522 includes a list of features inputted into the machine learning model(s) of each experiment, column 524 includes a model name and/or type (as represented by a graphical icon) of the machine learning model(s) used in each experiment, and column 526 includes the status of each experiment (e.g., values of precision, recall, and/or other performance metrics for an experiment that has been run).

A user may click on a cell identified by a particular row and column to navigate to a different screen of GUI 124 to view more detailed information related to the cell. For example, the user may click on a cell in column 520 to view all notes for the corresponding experiment. In another example, the user may click on a cell in column 522 to navigate to one or more screens in feature engineering GUI 204, which is described in further detail below with respect to FIGS. 5C and 5D. In a third example, the user may click on a cell in column 524 to navigate to one or more screens in network generation GUI 202, network analysis GUI 212, and/or network description GUI 232, which are described in further detail below with respect to FIGS. 5E-5F. In a fourth example, the user may click on a cell in column 526 to navigate to one or more screens in network evaluation GUI 222, which is described in further detail below with respect to FIG. 5G.

The user may interact with user-interface elements in component 512 to sort, filter, and/or otherwise organize or access information related to experiments in components 514-518 shown below component 512. For example, the user may input a search term into a text field along the left side of component 512 to retrieve a list of experiments that match the search term. In another example, the user may click on three different icons to the right of the text field to access different "views" of the experiment (e.g., a list view shown in FIG. 5B, a grid view, a tree view, etc.). In a third example, the user may click on two buttons to the right of the icons to toggle between a "Recent" ordering of the experiments (e.g., an ordering of experiments from most recent to least recent) and a "Best" ordering (e.g., an ordering of experiments from best-performing to worst-performing). In a fourth example, the user may click on a "+" button along the right side of component 512 to add a new experiment to the project.

In one or more embodiments, each experiment is assigned a version number that represents a unique combination of information in columns 520-524 for the experiment. In addition, cells in one or more columns 520-524 are associated with different version numbers. As shown, three experiments represented by components 514-518 include the same name of "Customer Retention" and different version numbers (e.g., "v3," "v4," "v5"). Each experiment includes a different set of features, a different version of the "Membership Records Aug. 2019" dataset (e.g., "v2" or "v3"), a different machine learning model (e.g., "FF-Net" or "LGBM"), and/or a different model version (e.g., "v1" or "v2) of a given machine learning model.

When a change is made to one or more columns 520-524 associated with an experiment, the version number of the corresponding element is incremented along with the version number of the experiment. For example, any modification to a machine learning model may trigger an increase in the version number of the machine learning model, as well as the creation of a new version of the current experiment (along with a corresponding new version number) for which the modification to the machine learning model is made. Additional changes to the current experiment may be subsumed into this version up to the next training of the machine learning model, which marks the "completion" of the experiment. In another example, any modification to a dataset may trigger an increase in the version number(s) of the dataset, any machine learning models that use the modified dataset (e.g., after the machine learning model(s) are retrained using the modified dataset), and/or any experiments that use the modified dataset. In a third example, any changes to the features used by a machine learning model may trigger an increase in the version number(s) of the machine learning model (e.g., after the machine learning model is retrained using the features) and/or any experiments that use the machine learning model. Alternatively, when the feature set inputted into the machine learning model has changed but the number of features is unchanged, the architecture of the machine learning model may be unmodified, and thus the version number of the machine learning model may remain the same. In turn, the incrementing of an experiment's version number may correspond to the creation of a new experiment identified by the incremented version number and result in the inclusion of a new row for the experiment in the screen of FIG. 5B.

Figure 5C:
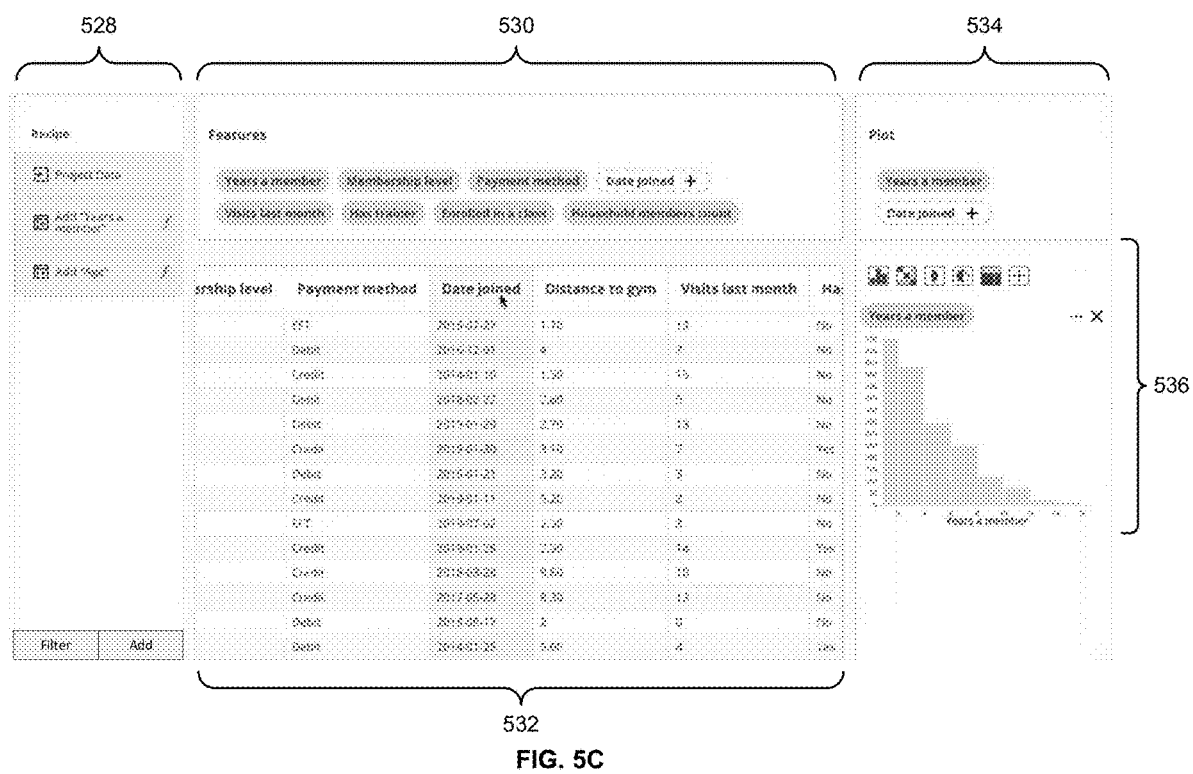
FIG. 5C is an example screenshot of the GUI of FIG. 1, according to various embodiments.

FIG. 5C is an example screenshot of GUI 124 of FIG. 1, according to various embodiments. More specifically, FIG. 5C shows a screen of feature engineering GUI 204, which may be reached by (for example) clicking on a cell under column 522 of the screen of FIG. 5B and/or clicking on a tab for the "Membership Records Aug. 2019" dataset in GUI 124.

The example screen of FIG. 5C includes a number of components 528-536 for viewing, selecting, creating, and/or otherwise managing a dataset inputted into a machine learning model. Component 530 shows a list of columns in the dataset that are inputted as features into the machine learning model, and component 532 shows a table of rows and columns in the dataset. Component 534 shows one or more columns to be included in a plot, and component 536 shows a plot of the column(s) specified in component 534. Component 536 additionally includes a number of icons that can be selected to view different types of plots related to the column(s) specified in component 534.

As shown, a "Date joined" column in component 532 is selected, which causes highlighting of the column within the table of component 532, the inclusion of the column name as a suggested feature in component 530, and the inclusion of the column name as a suggested plot element in component 534. A user may click on the column name in component 530 to confirm the addition of the feature to the machine learning model. The user may also click on the column name in component 534 to update the plot in component 536 with data in the column.

Component 528 includes a list of recipes for the dataset. In some embodiments, each recipe shown in component 528 includes a history of one or more operations or modifications that have been applied to generate a given version of the dataset (e.g., the version of the dataset shown in the table of component 532). The user may interact with a given recipe to "step" through the corresponding history of changes. For example, the user may click on an operation in a recipe to "undo" the operation and revert the table shown in component 532 to the state of the dataset prior to the operation.

Component 528 also includes a "Filter" button and an "Add" button representing two types of operations that can be added to a given recipe. The "Filter" button may be selected to remove rows from a dataset, and the "Add" button may be selected to add a column to a dataset (e.g., using code that specifies how data in the column is created or imported). Component 528 may also be updated with user-interface elements for specifying other types of operations that can be used with the recipes.

Figure 5D:
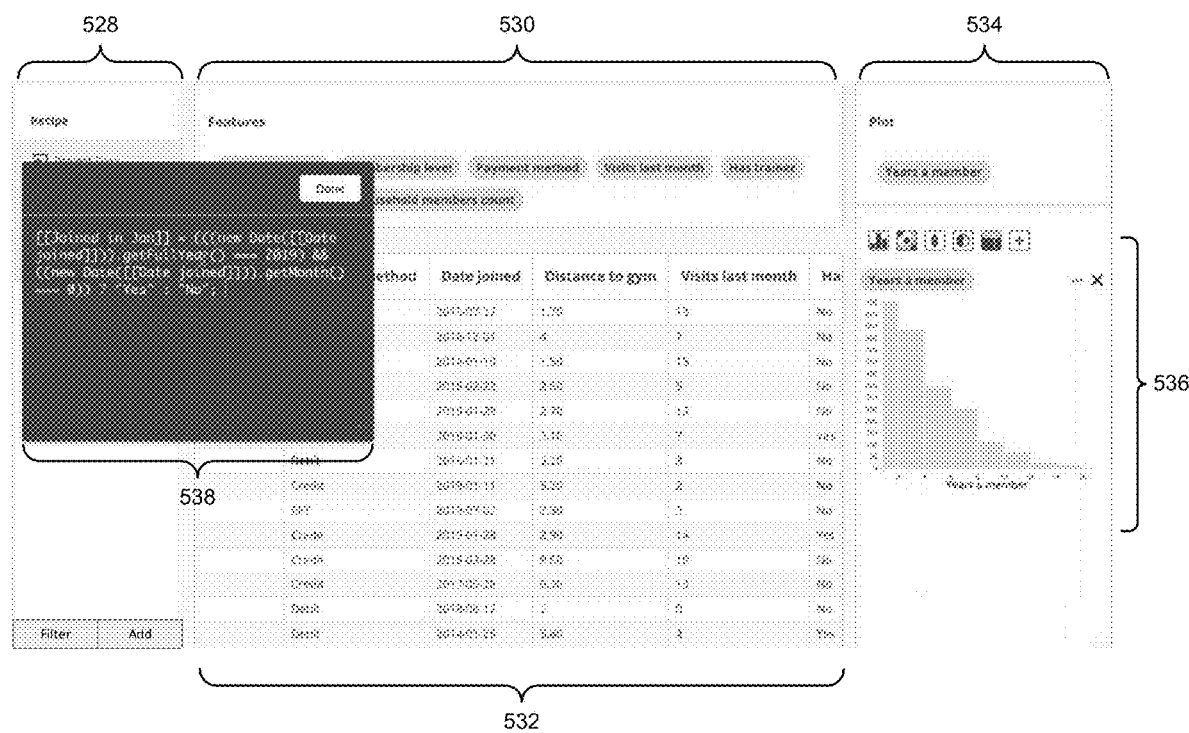
FIG. 5D is an example screenshot of the GUI of FIG. 1, according to various embodiments.

FIG. 5D is an example screenshot of GUI 124 of FIG. 1, according to various embodiments. In particular, FIG. 5D shows the screen of FIG. 5C after the "Add" button in component 528 is selected. As shown, the screen of FIG. 5D includes a new component 538 that includes a text box into which code to generate a new column named "Joined in Jan" is inputted. This "Add" operation generates a binary value that is set to "Yes" when the "Date Joined" column of a record in the dataset is equal to January 2019 and to "No" otherwise.

After the "Add" operation is complete, the user may click on the "Done" button in component 538 to add the column to the dataset. Once the column is in the dataset, the user may interact with components 530-532 to add the column as a feature for the machine learning model and/or with components 534-536 to view one or more plots containing data in the column.

Figure 5E:
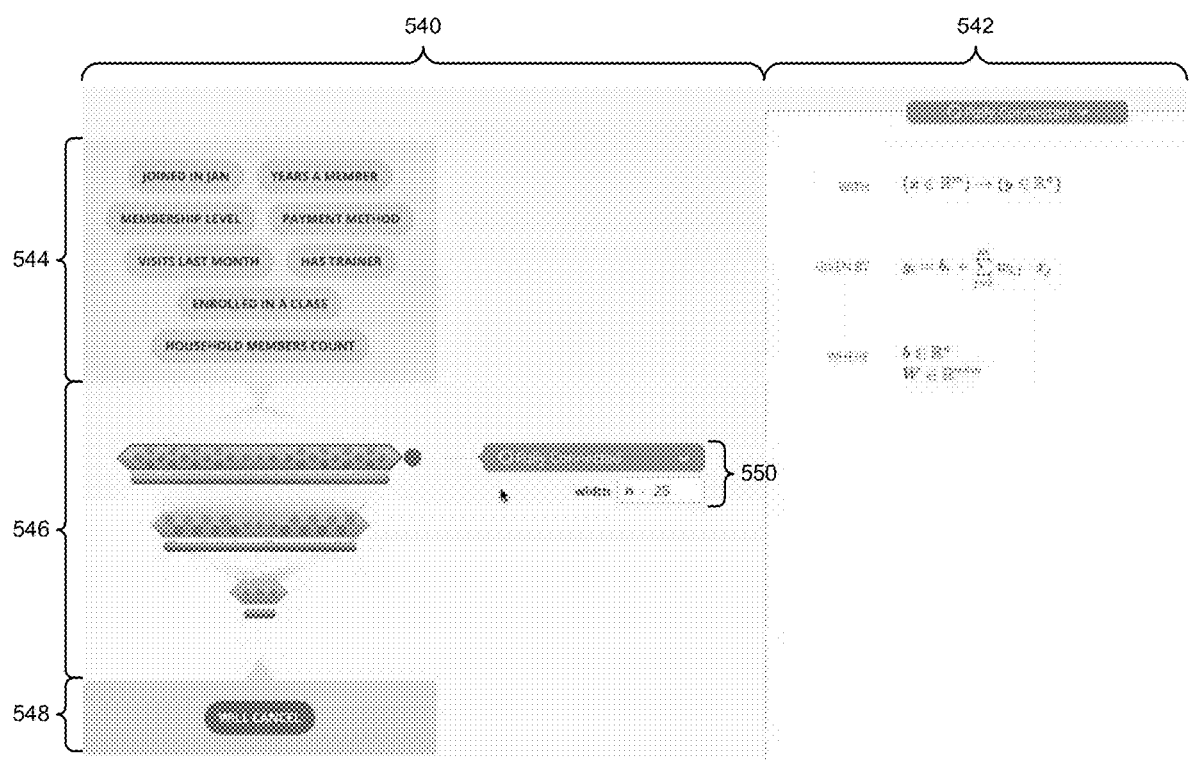
FIG. 5E is an example screenshot of the GUI of FIG. 1, according to various embodiments.

FIG. 5E is an example screenshot of GUI 124 of FIG. 1, according to various embodiments. More specifically, FIG. 5E shows an example screen in network generation GUI 202. As shown, the screen includes a component 540 for visually creating a machine learning model. Component 540 includes a first portion 544 that illustrates features inputted into the machine learning model. For example, portion 544 may show the column names of columns in the "Membership Records Aug. 2019" dataset that have been added as features for the machine learning model.

Component 540 also includes a second portion 546 that graphically depicts the machine learning model. Portion 546 includes a number of horizontal hexagonal bars representing layers of a neural network. Each bar is followed by a rectangular bar of a different color, which represents the activation function for the corresponding layer.

Within portion 546, a hexagonal bar representing the first layer of the neural network is currently selected, which causes a user-interface element 550 to be displayed to the right of the bar. User-interface element 550 indicates that the layer is a fully connected layer with a width (i.e., number of neurons) that is set to 25. A user may interact with a drop-down menu that currently shows "Fully Connected" in user-interface element 550 to select a different type of layer (e.g., convolutional, max pooling, mean pooling, long short-term memory (LSTM), residual, custom, etc.). The user may also interact with a text field that currently shows "n=25" in user-interface element 550 to select a different width for the layer. The user may also, or instead, click and drag the side of the hexagonal bar to change the width of the layer.

Component 540 additionally includes a third portion 548 that illustrates the output of the machine learning model. This output includes the "Will Cancel" label specified in the "Success Criteria" component 504 of the screenshot of FIG. 5A.

The screen of FIG. 5E also includes a component 542 for viewing and/or modifying source code that includes mathematical expressions used to define the machine learning model. Within the screenshot of FIG. 5E, component 542 shows a number of mathematical expressions related to the fully connected layer selected in portion 546. The first mathematical expression specifies the domain of the input "x" into the layer and the range of the output "y" from the layer. The second mathematical expression includes a formula for calculating the output from the input. The third mathematical expression specifies the types of values that are used in the formula represented by the second mathematical expression. The user may select individual mathematical expressions in component 542 to edit the mathematical expressions (e.g., within text fields that are shown as overlays in the screen). When a custom layer is selected in the drop-down menu of user-interface element 550, component 542 may be used by the user to specify one or more mathematical expressions that define the custom layer.

Figure 5F:
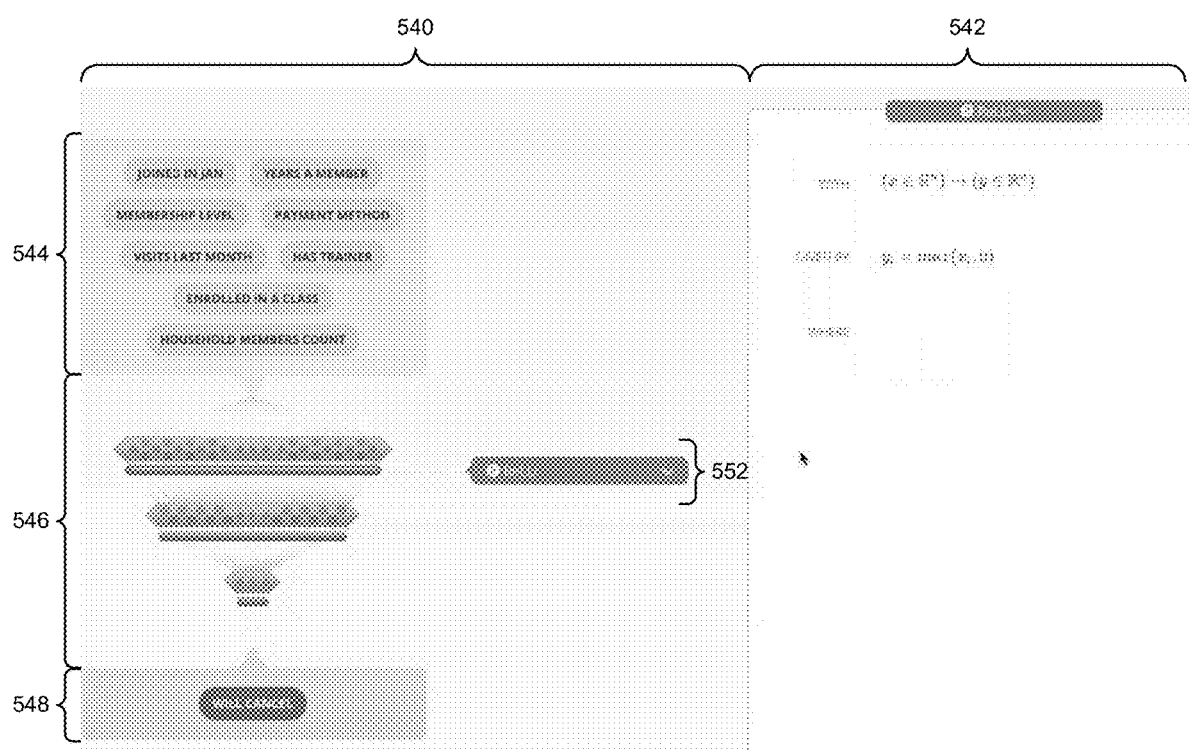
FIG. 5F is an example screenshot of the GUI of FIG. 1, according to various embodiments.

FIG. 5F is an example screenshot of GUI 124 of FIG. 1, according to various embodiments. More specifically, FIG. 5F shows the example network generation GUI 202 of FIG. 5E after the rectangular bar representing the activation function for the first layer of the neural network is selected. In response to the selection, portion 546 shows a user-interface element 552 to the right of the bar. User-interface element 552 identifies the activation function as "ReLU" and includes a drop-down menu that can be used to select a different activation function for the layer.

In the screen of FIG. 5F, component 542 is also updated to show mathematical expressions related to the activation function. These mathematical expressions include the domain of the input "x" into the activation function and the range of the output "y" from the activation function, as well as the formula for the "ReLU" activation function. As with the screen of FIG. 5E, the user may click on individual mathematical expressions in component 542 to access text fields containing the mathematical expressions and/or edit the mathematical expressions within the text fields.

Figure 5G:
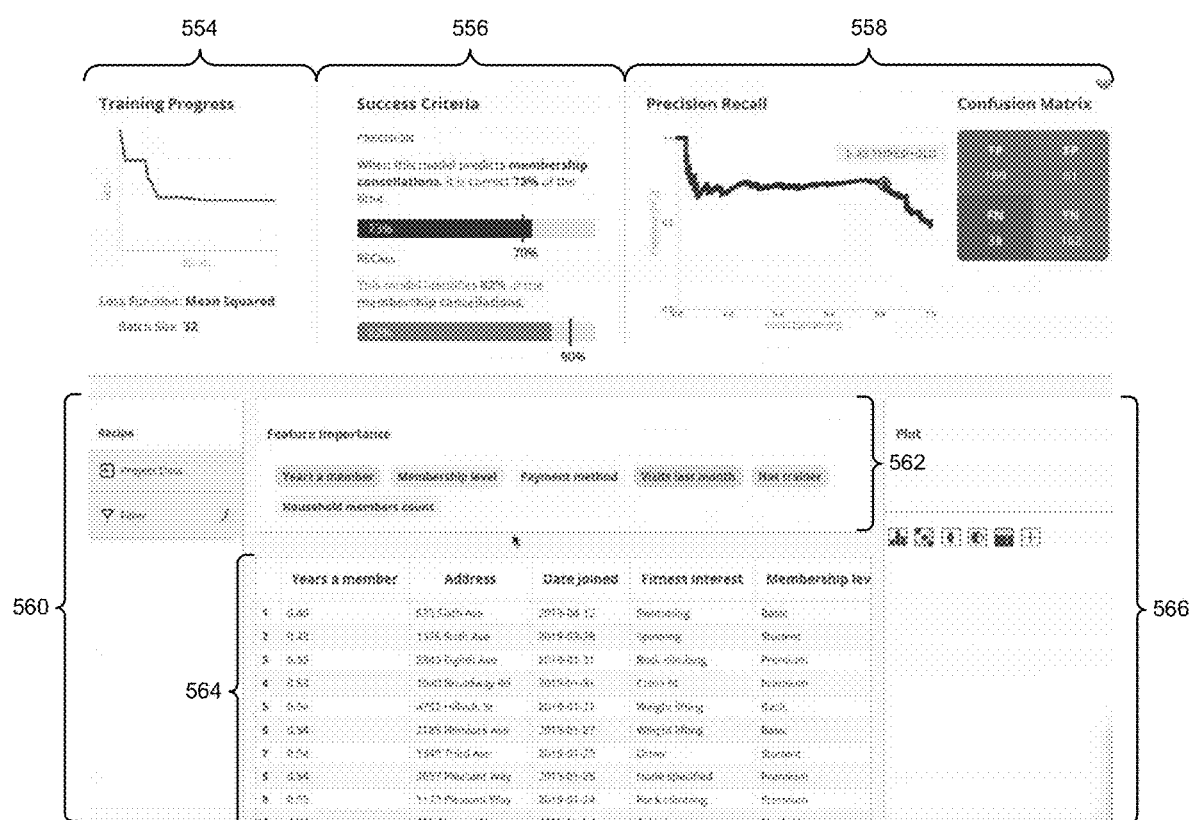
FIG. 5G is an example screenshot of the GUI of FIG. 1, according to various embodiments.

FIG. 5G is an example screenshot of GUI 124 of FIG. 1, according to various embodiments. More specifically, FIG. 5G shows an example screen of network evaluation GUI 222. As shown, the screen includes a number of components 554-566 for reviewing and/or analyzing training results associated with a machine learning model.

Component 554 shows information related to the "Training Progress" of the machine learning model. This information includes a plot of the loss of the machine learning model as a function of training epoch, the type of loss function used to calculate the loss, and the batch size used to train the machine learning model.

Component 556 shows information that compares the performance of the trained machine learning model to the "Success Criteria" specified in component 504 of the screen of FIG. 5A. This information indicates that the machine learning model meets the precision threshold of 70% but does not meet the recall threshold of 90%.

Component 558 shows information related to performance metrics for the machine learning model. In some embodiments, component 558 displays visualizations that reflect the success criteria specified in component 504. In the example screen of FIG. 5G, these visualizations include a precision-recall curve and a confusion matrix corresponding to a point in the precision-recall curve. Information in component 556 and 558 may be used to determine that the recall threshold of 90% can be met by reducing the number of false negatives produced by the machine learning model.

Component 560 shows recipes related to the dataset inputted into the machine learning model, and component 562 shows features identified as important to (i.e., having a significant effect on) the output of the machine learning model. Component 564 shows a table with rows and columns from a test dataset for the machine learning model (as specified in the partitioning shown in component 506), and component 566 may be used to view one or more plots related to the dataset. A user may filter data in the table and/or plot(s) by interacting with other components 554-558. For example, the user may click on individual cells in the confusion matrix of component 558 to view subsets of records in the dataset that pertain to those cells (i.e. true positives, false positives, false negatives, true negatives) in component 564 and/or plots related to the records in component 566. The user may use the filtered data to identify patterns or correlations that may improve the performance of the machine learning model (e.g., determining that the "Date Joined" column is set to January for a large number of the false negatives). Consequently, components 554-566 may allow users to assess the performance of the machine learning model in a given experiment and relate the performance to high-level objectives or success criteria identified in the screen of FIG. 5A.

Figure 6:
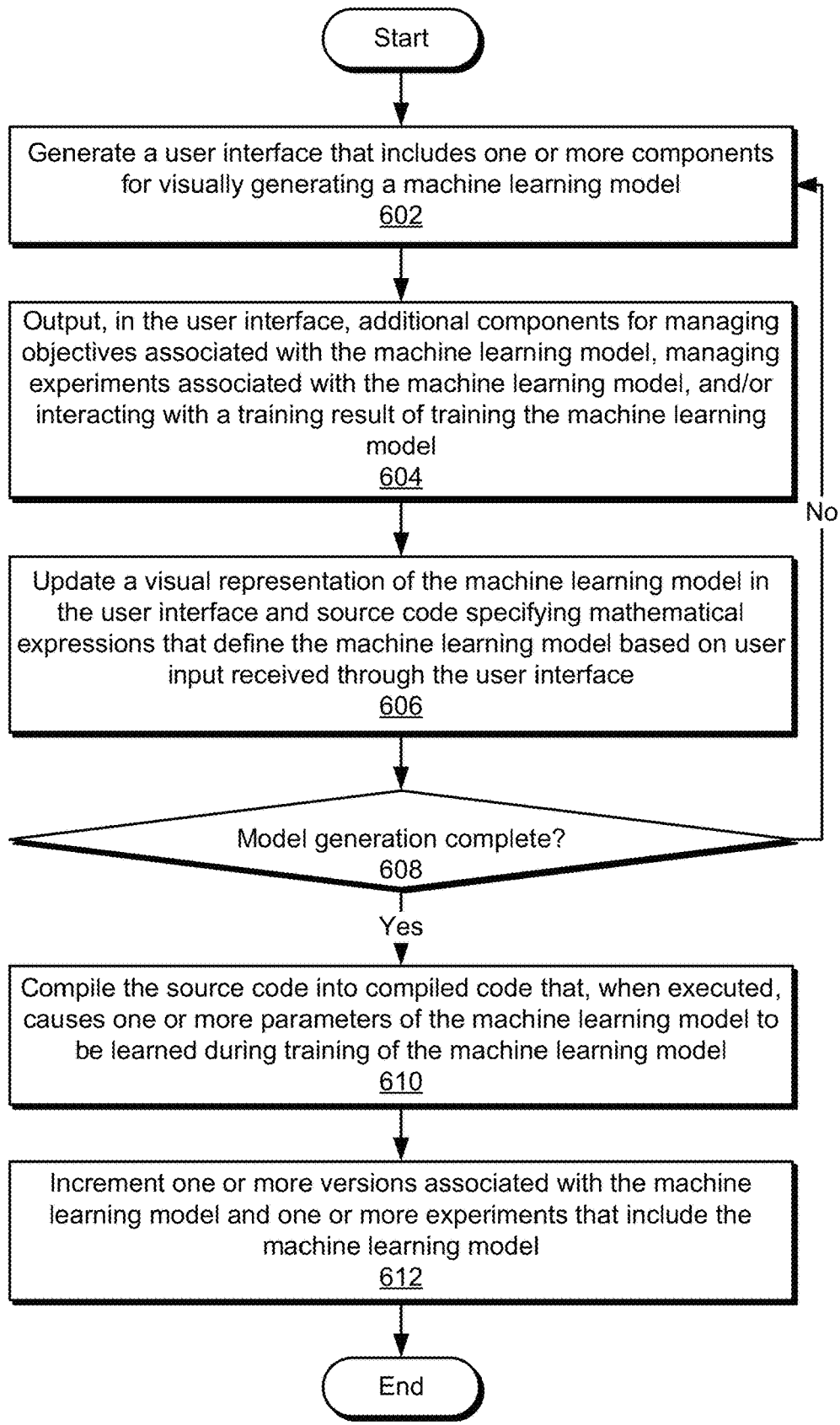
FIG. 6 is a flow diagram of method steps for creating a machine learning model, according to various embodiments.

FIG. 6 is a flow diagram of method steps for creating a machine learning model, according to various embodiments. Although the method steps are described in conjunction with the systems of FIGS. 1-3, persons skilled in the art will understand that any system configured to perform the method steps, in any order, is within the scope of the present invention.

As shown, AI design application 120 generates 602 a user interface (e.g., GUI 124) that includes one or more components for visually generating a machine learning model. For example, AI design application 120 renders, within GUI 124, graphical objects representing neurons, layers, layer types, connections, activation functions, inputs, outputs, and/or other components of a neural network. In another example, AI design application 120 generates, within GUI 124, graphical objects representing nodes, edges, inputs, outputs, conditions, and/or other components of a decision tree, random forest, gradient boosted tree, and/or another type of tree-based model. In a third example, AI design application 120 generates user-interface elements for identifying and/or choosing a model type for the machine learning model. In a fourth example, AI design application 120 provides one or more text boxes and/or other types of user-interface elements for specifying some or all source code for defining the machine learning model. This source code includes mathematical expressions that describe the behavior of the machine learning model, as described above. A user may interact with the graphical objects and/or enter text related to the graphical objects and/or source code to create the machine learning model in a visual manner within GUI 124.

AI design application 120 also outputs 604, in the user interface, additional components for managing objectives associated with the machine learning model, managing experiments associated with the machine learning model, and/or interacting with a training result of training the machine learning model. For example, AI design application 120 may render one or more screens in GUI 124 that can be used to view, modify, and/or otherwise manage a project schedule, a label to be predicted, a threshold for a performance metric associated with the label, and/or a source of training data for the machine learning model; an experiment version, a dataset version, a model version of the machine learning model, and/or an experiment status for each experiment that includes the machine learning model; and/or a precision-recall curve, a confusion matrix, a training dataset for the machine learning model, and/or a filter associated with the training dataset for each training result associated with the machine learning model.

AI design application 120 updates 606 a visual representation of the machine learning model in the user interface and source code specifying mathematical expressions that define the machine learning model based on user input received through the user interface. For example, AI design application 120 may change the color, shape, size, and/or text description of a layer, activation function, input, output, and/or another component of the machine learning model in response to the user input. In another example, AI design application 120 may add or remove a layer, activation function, input, output, and/or another component of the machine learning model in response to the user input. In a third example, AI design application 120 may display one or more mathematical expressions defining a component of the machine learning model based on a user's selection of the component and/or the user's textual input for specifying or modifying the mathematical expression(s).

AI design application 120 may continue performing operations 602-606 while making a determination as to whether generation of the machine learning model is complete 608. For example, AI design application 120 may continue generating screens of the user interface and modifying the visual representation and source code for the machine learning model while the user interacts with the user interface to visually create the machine learning model. AI design application 120 may determine that generation of the machine learning model is complete after the user selects a user-interface element requesting training of the machine learning model and/or provides other input via the user interface indicating that creation of the machine learning model is complete.

After generation of the machine learning model is complete, AI design application 120 compiles 610 the source code into compiled code that, when executed, causes one or more parameters of the machine learning model to be learned during training of the machine learning model. More specifically, AI design application 120 may generate an AST representation of the source code. This AST representation includes a tree structure, with child nodes in the tree structure representing constants and variables and parent nodes in the tree structure representing operators or statements. AI design application 120 then generates the compiled code based on the AST representation and determines that the parameter(s) in the machine learning model are to be learned based on a structure of the source code. For example, AI design application 120 may check the source code for semantic correctness and map variables in the source code to one or more assigned sources. AI design application 120 may then identify any variables that do not have an assigned source as variables (i.e., machine learning model parameters) to be learned.

Finally, AI design application 120 increments 612 one or more versions associated with the machine learning model and one or more experiments that include the machine learning model. For example, AI design application 120 may automatically increment the model version of the machine learning model whenever the machine learning model is "recompiled" or retrained with a new architecture, set of features, and/or training dataset. When the model version of the machine learning model is incremented, AI design application 120 may automatically increment the version of any experiments involving the machine learning model to ensure that different model versions of the machine learning model are tracked in different experiment versions.

In sum, the disclosed techniques provide an AI design application and user interface for visually creating and monitoring one or more machine learning models. The AI design application and user interface include components for visually generating the machine learning model(s), managing one or more objectives associated with the machine learning model(s), managing one or more experiments associated with the machine learning model(s), and/or reviewing or interacting with training results of training the machine learning model(s). A user may interact with the user interface to specify the architecture of the machine learning model(s) and/or mathematical expressions for defining the machine learning model instead of manually writing code for creating the machine learning model(s). When the user has finished creating a machine learning model via the user interface, the AI design application converts source code that includes the mathematical expressions into compiled machine code that can be executed to train the machine learning model on a dataset and/or evaluate the performance of the trained machine learning model.

By providing user-interface components for visually generating machine learning models and training, testing, and validating the machine learning models on user-specified datasets, the AI design application allows data scientists and/or other users involved in creating and using the machine learning models to avoid complex code, software stacks, and/or operations during creation and evaluation of the machine learning models. The AI design application thus reduces overhead over conventional techniques that involve additional processing time and/or resource consumption to carry out multiple rounds of writing, debugging, and compiling code for the machine learning models; manually defining and executing workflows and pipelines for training, testing, and validating the machine learning models; and tracking different versions of the machine learning models, datasets, and/or experiments. Visual representations of the machine learning models, datasets, and associated performance metrics may additionally improve understanding of the machine learning models, identification of features or other attributes that affect the performance of the machine learning models, and/or alignment of performance metrics with higher-level goals and objectives. In turn, machine learning models created using the AI application and user interface may have better performance and/or faster convergence than machine learning models that are created using conventional tools. Consequently, the disclosed techniques provide technological improvements in designing, training, evaluating, and/or selecting machine learning models.

1. In some embodiments, a method for creating a machine learning model comprises generating a user interface comprising one or more components for visually generating the machine learning model; modifying source code specifying a plurality of mathematical expressions that define the machine learning model based on user input received through the user interface; and compiling the source code into compiled code that, when executed, causes one or more parameters of the machine learning model to be learned during training of the machine learning model.

2. The method of clause 1, further comprising modifying a visual representation of the machine learning model in the user interface based on the user input.

3. The method of any of clauses 1-2, wherein the visual representation comprises one or more layers of the machine learning model, one or more neurons in the one or more layers, one or more features inputted into the machine learning model, and one or more outputs of the machine learning model.

4. The method of any of clauses 1-3, wherein the visual representation further comprises a layer type associated with the one or more layers, an activation function associated with the one or more layers, and a model type of the machine learning model.

5. The method of any of clauses 1-4, further comprising outputting, in the user interface, one or more additional components for managing one or more objectives associated with the machine learning model.

6. The method of any of clauses 1-5, wherein the one or more objectives comprise at least one of a project schedule, a label to be predicted, a threshold for a performance metric associated with the label, and a source of training data for the machine learning model.

7. The method of any of clauses 1-6, further comprising outputting, in the user interface, one or more additional components for managing one or more experiments associated with the machine learning model.

8. The method of any of clauses 1-7, wherein the one or more additional components comprise an experiment version, a dataset version, a model version of the machine learning model, and an experiment status.

9. The method of any of clauses 1-8, further comprising outputting, in the user interface, one or more additional components for interacting with a training result of training the machine learning model.

10. The method of any of clauses 1-9, wherein the one or more additional components comprise at least one of a precision-recall curve, a confusion matrix, a training dataset for the machine learning model, and a filter associated with the training dataset.

11. The method of any of clauses 1-10, wherein compiling the source code into the compiled code comprises generating an abstract syntax tree (AST) representation of the source code; generating the compiled code based on the AST representation; and determining that the one or more parameters in the machine learning model is to be learned based on a structure of the source code.

12. The method of any of clauses 1-11, wherein the one or more components comprise a component for specifying at least a portion of the source code for defining the machine learning model.

13. The method of any of clauses 1-12, further comprising upon generating the compiled code, incrementing one or more versions associated with the machine learning model and an experiment comprising the machine learning model.

14. In some embodiments, a non-transitory computer readable medium stores instructions that, when executed by a processor, cause the processor to perform the steps of generating a user interface comprising one or more components for visually generating a machine learning model; modifying source code specifying a plurality of mathematical expressions that define the machine learning model based on user input received through the user interface; modifying a visual representation of the machine learning model in the user interface based on the user input; and compiling the source code into compiled code that, when executed, causes one or more parameters of the machine learning model to be learned during training of the machine learning model.

15. The non-transitory computer readable medium of clause 14, wherein the steps further comprise outputting, in the user interface, one or more additional components for managing (i) one or more objectives associated with the machine learning model and (ii) one or more experiments associated with the machine learning model.

16. The non-transitory computer readable medium of any of clauses 14-15, wherein the one or more additional components comprise an experiment version, a dataset version, a model version of the machine learning model, and an experiment status.

17. The non-transitory computer readable medium of any of clauses 14-16, wherein the steps further comprise outputting, in the user interface, one or more additional components for interacting with a training result of training the machine learning model.

18. The non-transitory computer readable medium of any of clauses 14-17, wherein the one or more additional components comprise at least one of a precision-recall curve, a confusion matrix, a training dataset for the machine learning model, and a filter associated with the training dataset.

19. The non-transitory computer readable medium of any of clauses 14-18, wherein the visual representation comprises one or more layers of the machine learning model, one or more neurons in the one or more layers, one or more features inputted into the machine learning model, one or more outputs of the machine learning model, a layer type associated with the one or more layers, an activation function associated with the one or more layers, or a model type of the machine learning model.

20. In some embodiments, a system comprises a memory that stores instructions, and a processor that is coupled to the memory and, when executing the instructions, is configured to generate a user interface comprising one or more components for visually generating a machine learning model; modify source code specifying a plurality of mathematical expressions that define the machine learning model based on user input received through the user interface; modify a visual representation of the machine learning model in the user interface based on the user input; compile the source code into compiled code that, when executed, causes one or more parameters of the machine learning model to be learned during training of the machine learning model; and upon generating the compiled code, increment one or more versions associated with the machine learning model and an experiment comprising the machine learning model.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for creating a machine learning model, comprising:
    generating a user interface that comprises one or more components for visually generating the machine learning model;
    based on user input received through the user interface, modifying a pipeline of linked mathematical expressions in one or more lines of source code, wherein the pipeline of linked mathematical expressions is displayed via the user interface and defines the machine learning model, wherein the source code is written in a mathematics-based programming language in which mathematical notations are syntax for defining machine learning operations, and wherein the pipeline of linked mathematical expressions includes at least one of a mathematical summation operation notation $\Sigma$ or a mathematical set membership notation $\in$ that is displayed via the user interface; and
    compiling the source code into compiled code that, when executed, causes one or more parameters of the machine learning model to be learned during training of the machine learning model.

2. The method of claim 1, further comprising modifying a visual representation of the machine learning model in the user interface based on the user input.

3. The method of claim 2, wherein the visual representation comprises one or more layers of the machine learning model, one or more neurons in the one or more layers, one or more features inputted into the machine learning model, and one or more outputs of the machine learning model.

4. The method of claim 3, wherein the visual representation further comprises a layer type associated with the one or more layers and a model type of the machine learning model.

5. The method of claim 1, further comprising outputting, in the user interface, one or more additional components for managing one or more objectives associated with the machine learning model.

6. The method of claim 5, wherein the one or more objectives are associated with at least one of a project schedule, a label to be predicted, a threshold for a performance metric, or a source of training data for the machine learning model.

7. The method of claim 1, further comprising outputting, in the user interface, one or more additional components for managing one or more experiments associated with the machine learning model.

8. The method of claim 7, wherein the one or more additional components comprise an experiment version number assigned to at least one of the one or more experiments, a dataset version number assigned to a dataset used in at least one of the one or more experiments, a model version number assigned to the machine learning model, or an experiment status of at least one of the one or more experiments.

9. The method of claim 1, further comprising outputting, in the user interface, one or more additional components for interacting with a training result of training the machine learning model.

10. The method of claim 1, further comprising outputting, in the user interface, at least one of a precision-recall curve, a confusion matrix, a training dataset for the machine learning model, or a filter associated with the training dataset.

11. The method of claim 1, wherein compiling the source code into the compiled code comprises:
    generating an abstract syntax tree (AST) representation of the source code;
    generating the compiled code based on the AST representation; and
    determining that the one or more parameters in the machine learning model are to be learned during training of the machine learning model based on the one or more parameters not being assigned to any source in the source code.

12. The method of claim 1, wherein the one or more components comprise a component for specifying at least a portion of the source code for defining the machine learning model.

13. The method of claim 1, further comprising upon generating the compiled code, incrementing one or more version numbers assigned to the machine learning model and to an experiment that uses the machine learning model.

14. A non-transitory computer readable medium storing instructions that, when executed by a processor, cause the processor to perform the steps of:
- generating a user interface that comprises one or more components for visually generating a machine learning model;
- based on user input received through the user interface, modifying a pipeline of linked mathematical expressions in one or more lines of source code, wherein the pipeline of linked mathematical expressions is displayed via the user interface and defines the machine learning model, wherein the source code is written in a mathematics-based programming language in which mathematical notations are syntax for defining machine learning operations, and wherein the pipeline of linked mathematical expressions includes at least one of a mathematical summation operation notation $\Sigma$ or a mathematical set membership notation $\in$ that is displayed via the user interface;
- modifying a visual representation of the machine learning model in the user interface based on the user input; and
- compiling the source code into compiled code that, when executed, causes one or more parameters of the machine learning model to be learned during training of the machine learning model.

15. The non-transitory computer readable medium of claim 14, wherein the steps further comprise outputting, in the user interface, one or more additional components for managing (i) one or more objectives associated with the machine learning model and (ii) one or more experiments associated with the machine learning model.

16. The non-transitory computer readable medium of claim 15, wherein the one or more additional components comprise an experiment version number assigned to at least one of the one or more experiments, a dataset version number assigned to a dataset used in at least one of the one or more experiments, a model version number assigned to the machine learning model, or an experiment status of at least one of the one or more experiments.

17. The non-transitory computer readable medium of claim 14, wherein the steps further comprise outputting, in the user interface, one or more additional components for interacting with a training result of training the machine learning model.

18. The non-transitory computer readable medium of claim 14, wherein the steps further comprise outputting, in the user interface, at least one of a precision-recall curve, a confusion matrix, a training dataset for the machine learning model, or a filter associated with the training dataset.

19. The non-transitory computer readable medium of claim 14, wherein the visual representation comprises at least one of one or more layers of the machine learning model, one or more neurons in the one or more layers, one or more features inputted into the machine learning model, one or more outputs of the machine learning model, a layer type associated with the one or more layers, or a model type of the machine learning model.

20. A system, comprising:
- a memory that stores instructions, and
- a processor that is coupled to the memory and, when executing the instructions, is configured to:
  - generate a user interface that comprises one or more components for visually generating a machine learning model;
  - based on user input received through the user interface, modify a pipeline of linked mathematical expressions in one or more lines of source code, wherein the pipeline of linked mathematical expressions is displayed via the user interface and defines the machine learning model, wherein the source code is written in a mathematics-based programming language in which mathematical notations are syntax for defining machine learning operations, and wherein the pipeline of linked mathematical expressions includes at least one of a mathematical summation operation notation $\Sigma$ or a mathematical set membership notation $\in$ that is displayed via the user interface;
  - modify a visual representation of the machine learning model in the user interface based on the user input;
  - compile the source code into compiled code that, when executed, causes one or more parameters of the machine learning model to be learned during training of the machine learning model; and
  - upon generating the compiled code, increment one or more version numbers assigned to the machine learning model and to an experiment that uses the machine learning model.

* * * * *